United States Patent
Mainka et al.

(10) Patent No.: US 11,702,534 B2
(45) Date of Patent: Jul. 18, 2023

(54) BIOCOMPATIBLE LOW IMPACT $CO_2$ EMISSION POLYMER COMPOSITIONS, PHARMACEUTICAL ARTICLES AND METHODS OF PREPARING SAME

(71) Applicant: Braskem S.A., Camaçari (BR)

(72) Inventors: Camila Pilatti Mainka, São Paulo (BR); Amel Murgic, Cologne (DE); Thaysa Pando, São Paulo (BR); Cristhian Oliveira, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 17/537,090

(22) Filed: Nov. 29, 2021

(65) Prior Publication Data

US 2022/0169840 A1    Jun. 2, 2022

Related U.S. Application Data

(60) Provisional application No. 63/118,824, filed on Nov. 27, 2020.

(51) Int. Cl.
| | |
|---|---|
| *C08F 10/02* | (2006.01) |
| *C08L 23/06* | (2006.01) |
| *A61J 1/06* | (2006.01) |
| *B29C 49/00* | (2006.01) |
| *B29C 49/04* | (2006.01) |
| *B29D 22/00* | (2006.01) |
| *B29K 23/00* | (2006.01) |

(52) U.S. Cl.
CPC ............... *C08L 23/06* (2013.01); *A61J 1/065* (2013.01); *B29C 49/0005* (2013.01); *B29C 49/04* (2013.01); *B29D 22/003* (2013.01); *B29K 2023/0633* (2013.01); *C08F 10/02* (2013.01); *C08L 2203/02* (2013.01); *C08L 2203/10* (2013.01); *C08L 2207/066* (2013.01)

(58) Field of Classification Search
None
See application file for complete search history.

(56) References Cited

U.S. PATENT DOCUMENTS

| | | |
|---|---|---|
| 4,396,789 A | 8/1983 | Barrocas et al. |
| 9,181,143 B2 | 11/2015 | do Carmo et al. |
| 2020/0079939 A1* | 3/2020 | Müller .................... C08L 23/06 |
| 2020/0291146 A1 | 9/2020 | Dotti et al. |

FOREIGN PATENT DOCUMENTS

| | | | |
|---|---|---|---|
| KR | 102143595 B1 | 8/2020 | |
| WO | WO-2018174988 A1 * | 9/2018 | ............... B32B 5/18 |
| WO | 20190107626 A1 | 6/2019 | |
| WO | WO-2022045259 A1 * | 3/2022 | |

OTHER PUBLICATIONS

European Pharmacopoeia, 10th ed., 2018, Chapter 3.1.4. (Year: 2018).*
International Search Report issued in corresponding International Application No. PCT/IB2021/022235; dated Feb. 28, 2022 (4 pages).
Written Opinion of the International Searching Authority issued in corresponding International Application No. PCT/IB2021/022235; dated Feb. 28, 2022 (9 pages).

* cited by examiner

*Primary Examiner* — Richard A Huhn
(74) *Attorney, Agent, or Firm* — Osha Bergman Watanabe & Burton LLP

(57) ABSTRACT

A biobased polymer composition for pharmaceutical articles includes a low density polyethylene, in which at least a portion of ethylene is obtained from a renewable source of carbon. The biobased polymer composition exhibits an Emission Factor ranging from −3.5 to 0 kg $CO_{2e}$/kg of the biobased polymer composition, and is biocompatible for use in pharmaceutical packaging. A pharmaceutical article includes the biobased polymer composition and has a volume ranging from 0.04 ml to 10000 ml. A method for forming a pharmaceutical article includes extruding the biobased polymer composition at a temperature ranging from 100 to 250° C. and at a screw speed ranging from 20 to 100 rpm. A method for producing a biobased polymer composition includes polymerizing ethylene at least partially obtained from a renewable source of carbon to form a low density polyethylene.

35 Claims, No Drawings

BIOCOMPATIBLE LOW IMPACT $CO_2$ EMISSION POLYMER COMPOSITIONS, PHARMACEUTICAL ARTICLES AND METHODS OF PREPARING SAME

BACKGROUND

Low density polyethylene (LDPE) may be used to manufacture a varied range of pharmaceutical articles, including bottles, closures, ampoules, and sealed bags and the like, for various pharmaceutical products. While plastics such as polyethylene have many benefits to be used for pharmaceutical articles, production and manufacture of pharmaceutical articles often impacts the environment in detrimental ways including trash production and increased emission of $CO_2$ during processing because pharmaceutical articles may not be recycled and there are no regulations and guidelines which allow the use of recycled plastics in pharmaceutical articles.

One of the largest challenges faced by society today is to reduce greenhouse gas emissions in order to minimize the impact on the climate and environment. International agreements such as the Paris Agreement of 2015 may set limits on $CO_2$ emissions and drive the transition to a low carbon economy based on renewable energy, in addition to the development of new economic and business models. In some cases, new production techniques and material solutions may be used to reduce the carbon footprint during plastic manufacture and a life cycle perspective may be applied to weight the possible trade-offs between material functionality and environmental impact.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a biobased polymer composition for pharmaceutical articles, the biobased polymer composition comprising a low density polyethylene, in which at least a portion of ethylene is obtained from a renewable source of carbon, wherein the biobased polymer composition exhibits an Emission Factor in a range from −3.5 kg $CO_{2e}$/kg of the biobased polymer composition to 0 kg $CO_{2e}$/kg of the biobased polymer composition; and wherein the biobased polymer composition is biocompatible for use in pharmaceutical packaging as defined in European Pharmacopoeia $10^{th}$ Edition 2021 (10.4 and 10.5) Chapter 3.1.4.

In another aspect, embodiments disclosed herein relate to a pharmaceutical article comprising a biobased polymer composition, wherein a volume of the pharmaceutical article is in a range from 0.04 ml to 10000 ml.

In another aspect, embodiments disclosed herein relate to a method for forming a pharmaceutical article that includes extruding a biobased polymer composition at a temperature in a range from 100° C. to 250° C. and at a screw speed in a range from 20 rpm to 100 rpm to form a bottle, closure, ampoule, or sealed bag.

In another aspect, embodiments disclosed herein relate to a method for producing a biobased polymer composition, the method comprising polymerizing ethylene at least partially obtained from a renewable source of carbon to form a low density polyethylene, wherein a low density polyethylene exhibits an emission factor in a range from −3.5 kg $CO_{2e}$/kg of the low density polyethylene to 0 kg $CO_{2e}$/kg of the low density polyethylene; and wherein the low density polyethylene is biocompatible as defined in European Pharmacopoeia $10^{th}$ Edition 2021 (10.4 and 10.5) Chapter 3.1.4 and is capable of being comprised in a pharmaceutical article.

In yet another aspect, embodiments disclosed herein relate to a method for producing a pharmaceutical article comprising forming the pharmaceutical article with a biobased polymer composition by a process selected from the group consisting of an extrusion blow molding, an injection blow molding, a blown film process, compression blow forming and compression molding.

Other aspects and advantages of the claimed subject matter will be apparent from the following description and the appended claims.

DETAILED DESCRIPTION

In one aspect, embodiments disclosed relate to a biobased polymer composition comprising a low density polyethylene in which at least a portion of ethylene is obtained from a renewable source of carbon. In particular, embodiments of the present disclosures are directed to a biobased polymer composition which exhibits an Emission Factor lower than the Emission Factor a polymer composition produced exclusively from fossil fuel sources. In another aspect, embodiments disclosed are directed to a biobased polymer composition that is biocompatible as defined in European Pharmacopoeia $10^{th}$ Edition 2021 (10.4 and 10.5) Chapter 3.1.4.

Low Density Polyethylene

In one or more embodiments, the polymer composition may include biobased low density polyethylene produced from ethylene monomers, including low density polyethylene of varying molecular weights and densities.

Biobased polymer composition in accordance with the present disclosure may include "biobased polyethylene", which is low density polyethylene containing a weight percentage of monomers derived from a renewable source of carbon such as natural products, and are distinguished from polymers and monomers obtained from fossil-fuel sources. "Biobased material" in the present disclose refers to as natural sources from which a renewable source of carbon is derived for polymers and monomers used to produce the biobased polymer compositions. Because biobased materials are obtained from sources that may actively reduce $CO_2$ in the atmosphere or otherwise require less $CO_2$ emission during production, such materials are often regarded as "green" or renewable. However, it is also envisioned that the compositions may be exclusively biobased polyethylene or alternatively, may include a blend of biobased polyethylene and petroleum-based polyethylene without deviating from the scope of the present disclosure.

Examples of biobased polymer composition may include polymers generated from ethylene derived from natural sources such as sugarcane and sugar beet, maple, date palm, sugar palm, sorghum, American agave, starches, corn, wheat, barley, sorghum, rice, potato, cassava, sweet potato, algae, fruit, citrus fruit, materials comprising cellulose, wine, materials comprising hemicelluloses, materials comprising lignin, cellulosics, lignocelluosics, wood, woody plants, straw, sugarcane bagasse, sugarcane leaves, corn stover, wood residues, paper, polysaccharides such as pectin, chitin, levan, pullulan, and the like, and any combination thereof.

Biobased materials may be processed by any suitable method to produce ethylene, such as the production of ethanol from sugarcane, and the subsequent dehydration of ethanol to ethylene. Further, it is also understood that the fermenting produces, in addition to the ethanol, byproducts of higher alcohols. If the higher alcohol byproducts are present during the dehydration, then higher alkene impurities may be formed alongside the ethanol. Thus, in one or more embodiments, the ethanol may be purified prior to dehydration to remove the higher alcohol byproducts while in other embodiments, the ethylene may be purified to remove the higher alkene impurities after dehydration.

Biologically sourced ethanol, known as bio-ethanol, used to produce ethylene may be obtained by the fermentation of sugars derived from cultures from a renewable source of carbon such as that of sugar cane and beets, or from hydrolyzed starch, which is, in turn, associated with other materials such as corn. It is also envisioned that the biobased ethylene may be obtained from hydrolysis based products from cellulose and hemi-cellulose, which can be found in many agricultural by-products, such as straw and sugar cane husks. This fermentation is carried out in the presence of varied microorganisms, the most important of such being the yeast *Saccharomyces cerevisiae*. The ethanol resulting therefrom may be converted into ethylene by means of a catalytic reaction at temperatures usually above 300° C. A large variety of catalysts can be used for this purpose, such as high specific surface area gamma-alumina. Other examples include the teachings described in U.S. Pat. Nos. 9,181,143 and 4,396,789, which are herein incorporated by reference in their entirety.

In one or more embodiments, the low density polyethylene may have a biobased carbon content as determined by ASTM D6866-18 Method B at a percent in a range having a lower limit selected from any 50%, 60%, 70%, 80%, 90%, and 100%.

In one or more embodiments, the low density polyethylene may have a density according to ASTM D1505/D792 in a range having a lower limit selected from any one of 0.915 g/cm$^3$, 0.920 g/cm$^3$, 0.925 g/cm$^3$, and 0.928 g/cm$^3$ to an upper limit selected from any one of 0.930 g/cm$^3$, 0.932 g/cm$^3$, and 0.935 g/cm$^3$, where any lower limit may be combined with any upper limit.

In one or more embodiments, the low density polyethylene may have a melt flow index (MFI) according to ASTM D1238 at 190° C./2.16 kg having a lower limit selected from any one of 0.1 g/10 min, 0.2 g/10 min, 0.3 g/10 min, 0.35 g/10 min, 0.4 g/10 min and 0.5 g/10 min to an upper limit selected from any one of 0.45 g/10 min, 0.5 g/10 min, 0.6 g/10 min, 0.7 g/10 min, 0.8 g/10 min, 0.9 g/10 min and 1.0 g/10 min, where any lower limit may be combined with any upper limit.

In one or more embodiments, the low density polyethylene may have a number average molecular weight (Mn) in a range having a lower limit selected from any one of 11 kg/mol, 12 kg/mol and 13 kg/mol to an upper limit selected from any one of 17 kg/mol, 18 kg/mol and 19 kg/mol where any lower limit may be combined with any upper limit.

In one or more embodiments, the low density polyethylene may have a weight average molecular weight (Mw) in a range having a lower limit selected from any one of 60 kg/mol, 70 kg/mol and 80 kg/mol to an upper limit selected from any one of 90 kg/mol, 100 kg/mol and 110 kg/mol where any lower limit may be combined with any upper limit.

In one or more embodiments, the low density polyethylene may have a Z average molecular weight (Mz) in a range having a lower limit selected from any one of 170 kg/mol, 190 kg/mol and 210 kg/mol to an upper limit selected from any one of 260 kg/mol, 280 kg/mol and 300 kg/mol where any lower limit may be combined with any upper limit.

In one or more embodiments, the low density polyethylene may have a ratio of the Mw to the Mn in a range having a lower limit selected from any one of 4 and 4.5 to an upper limit selected from any one of 6.5 and 7 where any lower limit may be combined with any upper limit.

Molecular weight analysis is carried out by gel permeation chromatography (GPC). In one or more embodiments, the GPC experiments may be carried out by gel permeation chromatography coupled with triple detection, with an infrared detector IR5 and a four-bridge capillary viscometer (PolymerChar) and an eight-angle light scattering detector (Wyatt). A set of 4 mixed bed, 13 μm columns (Agilent) may be used at a temperature of 150° C. The experiments may use a concentration of 1 mg/mL, a flow rate of 1 mL/min, a dissolution temperature and time of 160° C. and 90 minutes, respectively, an injection volume of 200 μL, and a solvent of 1,2,4-trichlorobenzene stabilized with 300 ppm of BHT.

In one or more embodiments, the low density polyethylene may have a gel rating, using OCS Gel Counting Apparatus, for a size of 210 to 500 μm of 200 gel/m$^2$ or less, 190 gel/m$^2$ or less, 180 gel/m$^2$ or less, 170 gel/m$^2$ or less, 160 gel/m$^2$ or less, or 150 gel/m$^2$ or less. Gels are highly localized imperfections in the polyolefin material that become apparent when the material is converted into films. The quantity of "gels", or gel "rating", may be determined using an OCS Gel Counting Apparatus such as a Measuring Extruder Model ME20-2800-V3, chill roll unit model CR9, available from Optical Control Systems. The OCS system evaluates slightly over 1.0 m$^2$ of film per test. The OCS system, at the completion of each test, generates a summary of the gel data per 1.0 m$^2$ of film.

In one or more embodiments, the low density polyethylene may have a gel rating, using OCS Gel Counting Apparatus, for a size of 501 to 1000 μm of 10 gel/m$^2$ or less, 9 gel/m$^2$ or less, 8 gel/m$^2$ or less, 7 gel/m$^2$ or less, 6 gel/m$^2$ or less, or 5 gel/m$^2$ or less.

In one or more embodiments, the low density polyethylene may have a gel rating, using OCS Gel Counting Apparatus, for a size of 1001 to 1500 μm of 1.0 gel/m$^2$ or less, 0.9 gel/m$^2$ or less, 0.8 gel/m$^2$ or less, 0.7 gel/m$^2$ or less, 0.6 gel/m$^2$ or less, or 0.5 gel/m$^2$ or less.

In one or more embodiments, the low density polyethylene may have a gel rating, using OCS Gel Counting Apparatus, for a size of greater than 1500 μm of 0 gel/m$^2$.

In one or more embodiments, the low density polyethylene may have a melt temperature (Tm$_2$), as determined by ASTM D3418, in a range having a lower limit selected from any one of 116° C., 117° C. and 118° C. to an upper limit selected from any one of 120° C., 121° C. and 122° C. where any lower limit may be combined with any upper limit.

In one or more embodiments, the low density polyethylene may have a crystallization temperature (T$_c$), as determined by ASTM D3418, in a range having a lower limit selected from any one of from 95° C., 97.5° C., and 100° C. to an upper limit selected from any one of 105° C., 110° C. and 115° C. where any lower limit may be combined with any upper limit.

In one or more embodiments, the low density polyethylene may have a heat of melting ($\Delta H_m$) in a range having a lower limit selected from any one of from 120 J/g, 125 J/g, and 130 J/g to an upper limit selected from any one of 140 J/g, 150 J/g and 160 J/g where any lower limit may be combined with any upper limit.

In one or more embodiments, the low density polyethylene may have a Vicat softening temperature at 10N, as determined by ASTM D1525, in a range having a lower limit selected from any one of 90° C., 95° C. and 100° C., to an upper limit selected from any one of 105° C., 110° C. and 120° C. where any lower limit may be combined with any upper limit.

In one or more embodiments, the low density polyethylene may have a tensile strength at yield, as determined by ASTM D638 Type IV, in a range having a lower limit selected from any one of 10 MPa, 12 MPa and 14 MPa to an upper limit selected from any one of 16 MPa, 18 MPa and 20 MPa where any lower limit may be combined with any upper limit.

In one or more embodiments, the low density polyethylene may have a tensile elongation at yield, as determined by ASTM D638 Type IV, in a range having a lower limit selected from any one of 10% and 12% to an upper limit selected from any one of 18% and 20% where any lower limit may be combined with any upper limit.

In one or more embodiments, the low density polyethylene may have a tensile elongation at break, as determined by ASTM D638 Type IV, in a range having a lower limit selected from any one of 500%, 700% and 900% to an upper limit selected from any one of 1100%, 1300% and 1500% where any lower limit may be combined with any upper limit.

In one or more embodiments, the low density polyethylene may have a 1% secant tensile modulus, as determined by ASTM D638 Type IV, in a range having a lower limit selected from any one of 400 MPa, 450 MPa and 500 MPa to an upper limit selected from any one of 550 MPa, 600 MPa, 650 MPa and 700 MPa where any lower limit may be combined with any upper limit.

In one or more embodiments, the low density polyethylene may have a Young's modulus, as determined by ASTM D638 Type IV, in a range having a lower limit selected from any one of 400 MPa, 450 MPa and 500 MPa to an upper limit selected from any one of 550 MPa, 600 MPa, 650 MPa and 700 MPa where any lower limit may be combined with any upper limit.

In one or more embodiments, the low density polyethylene may have a 1% secant flexural modulus, as determined by ASTM D790, in a range having a lower limit selected from any one of 300 MPa, 350 MPa, 400 MPa to an upper limit selected from any one of 450 MPa, 500 MPa, 550 MPa and 600 MPa where any lower limit may be combined with any upper limit.

In one or more embodiments, the low density polyethylene may have a haze, as determined by ASTM D1003, in a range having a lower limit selected from any one of 3%, 4% and 5% to an upper limit selected from any one of 6%, 7% and 8% where any lower limit may be combined with any upper limit.

In one or more embodiments, the low density polyethylene may resist a steam heated to a temperature of 100° C., 105° C., 110° C., or 112.5° C. for a period of 45 minutes, 50 minutes, 55 minutes, 60 minutes or 65 minutes, to be suitable for steam sterilization.

In on ore more embodiments, the biobased polymer composition (as well as the biobased polyethylene) may be biocompatible as defined in European Pharmacopoeia 10$^{th}$ Edition 2021 (10.4 and 10.5) Chapter 3.1.4 and is capable of being used to form pharmaceutical articles. Another word, the biocompatible biobased polymer composition may be suitable for the use in the pharmaceutical articles.

In the present disclosure, the term "biocompatible" refers to as a compatibility with living tissue or a living system by not being toxic, injurious or physiologically reactive and not causing immunological rejection and a "biocompatible" polymer composition is capable of meeting various regulatory standards such as European Pharmacopoeia 10th Edition 2021 (10.4 and 10.5) Chapter 3.1.4.

As disclosed herein, the biocompatibility of biobased polymer compositions may be tested and determined in accordance with, for example, European Pharmacopoeia 10th Edition 2021 (10.4 and 10.5) Chapter 3.1.4. For Example, in European Pharmacopoeia Chapter 3.1.4 "Polyethylene without additives for containers for parenteral preparations and for ophthalmic preparations" sections "Tests and Identification", test methods are outlined in order to determine the acidity, alkalinity, sulfated ash and heavy metal extractables of polyethylene.

Pharmaceutical Articles

In one aspect, embodiments disclosed relate to a pharmaceutical article comprising the biobased polymer composition. The pharmaceutical articles may include bottles, closures, ampoules and sealed bags for pharmaceutical products. The pharmaceutical products may include eye drops, ear drops, nose drops, homeopathic, inhalation solutions, infusion fluids, injection fluids, rinsing solutions, drinkable solutions, creams, ointments, gels, wound care products, vaginal applications, rectal applications, disinfectants, diagnostic agents, intravenous solutions, and the like.

In one or more embodiments, the pharmaceutical article may have a volume in a range having a lower limit selected from any one of 0.04 ml, 0.05 ml, 0.06 ml, 0.75 ml and 0.10 ml to an upper limit selected from any one of 9000 ml, 9250 ml, 9500 ml, 9750 ml, and 10000 ml where any lower limit may be combined with any upper limit.

In one or more embodiments, the pharmaceutical article may be biocompatible as defined in European Pharmacopoeia 10th Edition 2021 (10.4 and 10.5) Chapter 3.1.4. Another word, a biocompatible pharmaceutical article is capable of meeting various regulatory standards such as European Pharmacopoeia 10th Edition 2021 (10.4 and 10.5) Chapter 3.1.4.

In one or more embodiments, the pharmaceutical article may resist a steam heated to a temperature of 100° C., 105° C., 110° C., or 112.5° C. for a period of at least 45 minutes, 50 minutes, 55 minutes, 60 minutes or 65 minutes to be suitable for steam sterilization.

In one or more embodiments, a biobased polymer composition and a pharmaceutical article comprising the biobased polymer composition may be certified as to their renewable carbon content, according to the methodology described in the technical standard ASTM D 6866-18, "Standard Test Methods for Determining the Biobased Content of Solid, Liquid, and Gaseous Samples Using Radiocarbon Analysis."

In one or more embodiments, the biobased polymer composition (as well as the biobased polyethylene) may exhibit an emission factor in a range from −3.5 kg $CO_{2e}$/kg of the biobased polymer composition to 0 kg $CO_{2e}$/kg of the biobased polymer composition.

As disclosed herein, the Emission Factor of a polymer composition and a pharmaceutical article comprising the biobased polymer composition may be calculated according to the international standard ISO 14044:2006—"ENVIRONMENTAL MANAGEMENT—LIFE CYCLE ASSESSMENT—REQUIREMENTS AND GUIDELINES". The boundary conditions consider the cradle to gate approach. Numbers are based on peer reviewed LCA ISO 14044 compliant study and the environmental and life cycle model are based on SimaPro® software. Ecoinvent is used as background database and IPCC 2013 GWP100 is used as LCIA method. For example, a life cycle analysis of the steps involved in the production of a biobased polyethylene from sugarcane may involve Emission Factors calculated for each step, as shown in Table 1.

TABLE 1

Sample calculation of an Emission Factor for the production of a biobased polyethylene

| Impact Category | Resin | Emission Factor (kg $CO_{2e}$/kg resin) |
|---|---|---|
| Sugarcane production | Agricultural operations | 0.91 |
|  | Land use change credits | −1.10 |
|  | $CO_2$ Uptake | −3.14 |
|  | Subtotal | −3.33 |
| Ethanol Production | Ethanol production | 0.03 |
|  | Bagasse burning | 0.16 |
|  | Electricity cogeneration credits | −1.17 |
|  | Subtotal | −0.98 |
| Biobased PE Production | Ethanol transport | 0.46 |
|  | Industrial Operations (Ethylene and PE) | 0.76 |
|  | Subtotal | 1.22 |
|  | TOTAL | −3.09 |

Methods for Producing a Biobased Polymer Composition

In another aspect, embodiments disclosed herein are directed to methods of preparing the biobased polymer composition. The methods in accordance with the present disclosure may include the general steps of polymerizing ethylene at least partially obtained from a renewable source of carbon to form a low density polyethylene, wherein the low density polyethylene exhibits an emission factor in a range from −3.5 kg $CO_{2e}$/kg of the low density polyethylene to 0 kg $CO_{2e}$/kg of the low density polyethylene; and wherein the low density polyethylene is biocompatible as defined in European Pharmacopoeia $10^{th}$ Edition 2021 (10.4 and 10.5) Chapter 3.1.4 and is suitable for use in pharmaceutical articles. In other words, a biocompatible low density polyethylene is capable of meeting various regulatory standards such as European Pharmacopoeia 10th Edition 2021 (10.4 and 10.5) Chapter 3.1.4 and is suitable for the use in the pharmaceutical articles.

In one or more embodiments, the method for producing a biobased polymer composition may further comprise fermenting the renewable source of carbon to produce ethanol and dehydrating the ethanol to produce the ethylene.

Methods for Producing Pharmaceutical Articles

In another aspect, embodiments disclosed herein directed to methods of producing the pharmaceutical articles comprising the biobased polymer composition. The methods of producing the pharmaceutical article comprising biobased polymer composition in accordance with the present disclosure may include using continuous or discontinuous extrusion. Methods may use single-, twin- or multi-screw extruders, which may be used at temperatures ranging from 100° C. to 250° C., from 120° C. to 230° C., from 140° C. to 210° C., from 160° C. to 200° C., or from 175° C. to 190° C. in some embodiments. In some embodiments, the polymer composition is added to an extruder into the main or secondary feeder in the form of powder, pellets, granules, flakes or dispersion in liquids as solutions, emulsions and suspensions of one or more components.

In one or more embodiments, the pharmaceutical article may be extruded at a screw speed of in a range having a lower limit selected from any one of 20 rpm, 30 rpm, 40 rpm, 50 rpm and 60 rpm to an upper limit selected from any one of 70 rpm, 80 rpm, 90 rpm and 100 rpm where any lower limit may be combined with any upper limit In one or more embodiments, extrusion techniques in accordance with the present disclosure may also involve the preparation of a polymer composition concentrate (a masterbatch) that is then combined with other components to produce a polymer composition of the present disclosure.

In one or more embodiments, the biobased polymer composition prepared by extrusion may be in the form of powder, pellets, granules, flakes that are applicable to different molding processes, including processes selected from extrusion molding, coextrusion molding, extrusion coating, injection molding, compression blow forming, compression molding, injection blow molding, injection stretch blow molding, thermoforming, cast film extrusion, blown film extrusion, blown film process, foaming, extrusion blow molding, injection stretched blow molding, rotomolding, pultrusion, calendering, additive manufacturing, lamination, and the like, to produce manufactured articles.

In one or more embodiments, the pharmaceutical article is formed and filled with a pharmaceutical product by a blow-fill-seal process.

In one or more embodiments, the pharmaceutical article is an injection molded article, a thermoformed article, a film, a foam, a blow molded article, an additive manufactured article, a compressed article, a coextruded article, a laminated article, an injection blow molded article, a rotomolded article, an extruded article, monolayer articles, multilayer articles, or a pultruded article, and the like. In embodiments of a multilayer article, it is envisioned that at least one of the layers comprises the biobased polymer composition of the present disclosure.

EXAMPLE

A 3 ml ampoule with a weight of 1.7 grams is produced from a biobased low density polyethylene Braskem Medcol™ V7040 using KP55-24D parison head LK360 Extruder. Die gap is set at 0.8 mm and the processing temperature of the extruder is set in a range between 175° C. to 190° C. and the screw speed from 60 rpm to 70 rpm. The mold temperature is at 60° C. and the cycle time is 3.5 seconds.

The biocompatibility of the 3 ml ampoule is tested in accordance with European Pharmacopoeia $10^{th}$ Edition 2021 (10.4 and 10.5) Chapter 3.1.4.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A biobased polymer composition for pharmaceutical articles, the biobased polymer composition comprising:
   a low density polyethylene, in which at least a portion of ethylene is obtained from a renewable source of carbon, wherein the biobased polymer composition exhibits an Emission Factor in a range from −3.5 kg $CO_{2e}$/kg of the biobased polymer composition to 0 kg $CO_{2e}$/kg of the biobased polymer composition; and
   wherein the biobased polymer composition is biocompatible for use in pharmaceutical packaging as defined in European Pharmacopoeia 10th Edition 2021 (10.4 and 10.5) Chapter 3.1.4.

2. The biobased polymer composition of claim 1, wherein the biobased polymer composition has a biobased carbon content as determined by ASTM D6866-18 Method B of at least 50%.

3. The biobased polymer composition of claim 1, wherein the low density polyethylene has a density, according to ASTM D792, in a range from 0.915 to 0.935 g/cm$^3$.

4. The biobased polymer composition of claim 1, wherein the low density polyethylene has a melt flow rate according to ASTM D1238 at 190° C./2.16 kg in a range from 0.1 to 1.0 g/10 min.

5. The biobased polymer composition of claim 1, wherein the low density polyethylene has a gel rating, using an OCS Gel Counting Apparatus, for a size of 210 to 500 μm, of 200 gels/m$^2$ or less.

6. The biobased polymer composition of claim 1, wherein the low density polyethylene has a gel rating, using an OCS Gel Counting Apparatus, for a size of 501 to 1000 μm of 10 gels/m$^2$ or less.

7. The biobased polymer composition of claim 1, wherein the low density polyethylene has a gel rating, using an OCS Gel Counting Apparatus, for a size of 1001 to 1500 μm of 1.0 gels/m$^2$ or less.

8. The biobased polymer composition of claim 1, wherein the low density polyethylene has gel rating, using an OCS Gel Counting Apparatus, for a size of greater than 1500 μm of 0 gels/m$^2$.

9. The biobased polymer composition of claim 1, wherein the low density polyethylene has a melt temperature ($Tm_2$) in a range from 116° C. to 122° C.

10. The biobased polymer composition of claim 1, wherein the low density polyethylene has a crystallization temperature ($T_c$) in a range from 95° C. to 115° C.

11. The biobased polymer composition of claim 1, wherein the low density polyethylene has a heat of melting ($\Delta H_m$) in a range from 120 J/g to 160 J/g.

12. The biobased polymer composition of claim 1, wherein the low density polyethylene has a Vicat softening temperature at 10N, as determined by ASTM D1525, in a range from 90° C. to 120° C.

13. The biobased polymer composition of claim 1, wherein the low density polyethylene has a tensile strength at yield, as determined by ASTM D638 Specimen Type IV, in a range from 10 MPa to 20 MPa.

14. The biobased polymer composition of claim 1, wherein the low density polyethylene has a tensile strength at break, as determined by ASTM D638 Specimen Type IV, in a range from 10 MPa to 20 MPa.

15. The biobased polymer composition of claim 1, wherein the low density polyethylene has an elongation at yield, as determined by ASTM D638 Specimen Type IV, in a range from 10% to 20%.

16. The biobased polymer composition of claim 1, wherein the low density polyethylene has a tensile elongation at break, as determined by ASTM D638 Specimen Type IV, in a range from 500% to 1500%.

17. The biobased polymer composition of claim 1, wherein the low density polyethylene has a 1% secant tensile modulus, according to ASTM D638 Specimen Type IV, in a range from 400 MPa to 700 MPa.

18. The biobased polymer composition of claim 1, wherein the low density polyethylene has a Young's modulus, according to ASTM D638 Specimen Type IV, in a range from 400 MPa to 700 MPa.

19. The biobased polymer composition of claim 1, wherein the low density polyethylene has a 1% secant flexural modulus, according to D790, in a range from 300 MPa to 600 MPa.

20. The biobased polymer composition of claim 1, wherein the low density polyethylene has a haze, according to ASTM D1003, in a range from 3% to 8%.

21. The biobased polymer composition of claim 1, wherein the low density polyethylene has a number average molecular weight (Mn) in a range from 11 kg/mol to 19 kg/mol.

22. The biobased polymer composition of claim 1, wherein the low density polyethylene has a weight average molecular weight (Mw) in a range from 60 kg/mol to 110 kg/mol.

23. The biobased polymer composition of claim 1, wherein the low density polyethylene has a Z average molecular weight (Mz) in a range from 170 kg/mol to 300 kg/mol.

24. The biobased polymer composition of claim 1, wherein the low density polyethylene has a Mw/Mn ratio in a range from 4 to 7.

25. The biobased polymer composition of claim 1, wherein the low density polyethylene resists a steam heated to a temperature of 112.5° C. for a period of 65 minutes to be suitable for steam sterilization.

26. A pharmaceutical article comprising:
   the biobased polymer composition of claim 1,
   wherein a volume of the pharmaceutical article is in a range from 0.04 ml to 10000 ml.

27. The pharmaceutical article of claim 26,
   wherein the pharmaceutical article exhibits an emission factor in a range from −3.5 kg $CO_{2e}$/kg of the biobased polymer composition to 0 kg $CO_{2e}$/kg of the biobased polymer composition, and
   wherein the biobased polymer composition is biocompatible as defined in European Pharmacopoeia 10$^{th}$ Edition 2021 (10.4 and 10.5) Chapter 3.1.4 and is capable of being comprised in the pharmaceutical article.

28. The pharmaceutical article of claim 26, wherein the pharmaceutical article is selected from the group consisting of bottles, closures, ampoules, and sealed bags.

29. The pharmaceutical article of claim 26, wherein the pharmaceutical article resists a steam heated to a temperature of 112.5° C. for a period of 65 minutes to be suitable for steam sterilization.

30. The pharmaceutical article of claim 26, wherein the pharmaceutical article is extruded at a temperature in a range from 100° C. to 250° C. and at a screw speed in a range from 20 rpm to 100 rpm.

31. A method for forming a pharmaceutical article, comprising:
   extruding the biobased polymer composition of claim 1 at a temperature in a range from 100° C. to 250° C. and at a screw speed in a range from 20 rpm to 100 rpm to form a bottle, closure, ampoule, or sealed bag.

32. A method for producing the biobased polymer composition of claim 1, the method comprising:
   polymerizing ethylene at least partially obtained from the renewable source of carbon to form the low density polyethylene,
   wherein the low density polyethylene exhibits the emission factor in a range from −3.5 kg $CO_{2e}$/kg of the low density polyethylene to 0 kg $CO_{2e}$/kg of the low density polyethylene; and
   wherein the low density polyethylene is biocompatible as defined in European Pharmacopoeia $10^{th}$ Edition 2021 (10.4 and 10.5) Chapter 3.1.4 and is capable of being comprised in the pharmaceutical article.

33. The method of claim 32, further comprising:
   fermenting the renewable source of carbon to produce ethanol;
   dehydrating the ethanol to produce the ethylene.

34. A method for producing a pharmaceutical article comprising:
   forming the pharmaceutical article with the biobased polymer composition of claim 1 by a process selected from the group consisting of an extrusion blow molding, an injection blow molding, a blown film process, compression blow forming and compression molding.

35. The method of claim 34, wherein the pharmaceutical article is formed and filled with a pharmaceutical product by a blow-fill-seal process.

* * * * *